US005936824A

United States Patent [19]

Carpenter, Jr.

[11] Patent Number: 5,936,824

[45] Date of Patent: Aug. 10, 1999

[54] ENCAPSULATED MOV SURGE ARRESTER FOR WITH STANDING OVER 100,000 AMPS OF SURGE PER DOC

[75] Inventor: Roy Benson Carpenter, Jr., Boulder, Colo.

[73] Assignee: Lightning Eliminators and Consultants, Boulder, Colo.

[21] Appl. No.: 09/165,537

[22] Filed: Oct. 2, 1998

Related U.S. Application Data

[63] Continuation of application No. 08/910,410, Aug. 13, 1997, abandoned.

[51] Int. Cl.[6] ........ H02H 9/04

[52] U.S. Cl. ........ 361/126; 361/127; 361/117

[58] Field of Search ........ 361/117, 118, 361/126, 127, 131, 134, 135; 338/21

[56] References Cited

U.S. PATENT DOCUMENTS

| | | | |
|---|---|---|---|
| 4,779,164 | 10/1988 | Menzies, Jr. et al. | 361/734 |
| 4,875,137 | 10/1989 | Rozanski et al. | 361/837 |
| 4,899,248 | 2/1990 | Raudabaugh | 361/127 |
| 5,039,452 | 8/1991 | Thompson et al. | 252/518 |
| 5,088,001 | 2/1992 | Yaworski et al. | 361/127 |
| 5,220,480 | 6/1993 | Kershaw, Jr. et al. | 361/117 |
| 5,363,266 | 11/1994 | Wiseman et al. | 361/127 |
| 5,519,564 | 5/1996 | Carpenter, Jr. | 361/127 |

FOREIGN PATENT DOCUMENTS

| | | |
|---|---|---|
| 0229464 | 7/1987 | European Pat. Off. . |
| 0230103 | 7/1987 | European Pat. Off. . |
| 91/14304 | 9/1991 | WIPO . |
| 93/2617 | 12/1993 | WIPO . |

OTHER PUBLICATIONS

Ohio Brass Catalog 93 1986.

*Primary Examiner*—Jeffrey Gaffin
*Assistant Examiner*—Kim Huynh
*Attorney, Agent, or Firm*—Rick Martin

[57] ABSTRACT

An improved apparatus and method for encapsulating a single large MOV is shown. The MOV is sandwiched between aluminum contact plates. An epoxy fills the void space between the contact plates. A dielectric film encapsulates the entire sandwich. Soft films of aluminum foil or a deposition coating is used to cover the MOV surface to cure facial defects. An optional exterior case protects the MOV assemblies contained therein from short circuits due to dirt, grease or water build-up. The apparatus is designed to withstand over 100,000 amps of surge in a commercial up to 220 volt per phase secondary power system.

12 Claims, 8 Drawing Sheets

ENCAPSULATED MOV SURGE ARRESTER FOR WITH STANDING OVER 100,000 AMPS OF SURGE PER DOC

CROSS REFERENCE PATENTS

U.S. Pat. Nos. 5,039,452 to Thompson et al. and 5,519,564 to Carpenter, Jr. are incorporated herein by reference. The present application is a continuation in part with U.S. patent Ser. No. 08/910,410 filed Aug. 13, 1997 entitled Improved MOV Surge Arrester as invented by the same inventor now abandoned.

FIELD OF THE INVENTION

The present invention relates to a surge protector. In particular the present invention discloses an improved surge arrester using a single large ZnO surge arrester disk encapsulated between a pair of contact plates.

BACKGROUND OF THE INVENTION

Surge arresters are useful in protecting electronic circuitry from extreme, over-rating transient currents. These over-rating transients may be caused by switching transients or lightning strikes.

Some surge arresters, especially for higher voltage applications, operate by catastrophic failure of the surge arrester. This is not economically or functionally viable for certain applications, such as secondary, or low voltage applications.

One solution to the design of surge arresters is the use of Metal Oxide Varistors ("MOV"). These MOVs along with surge arresters utilizing them are currently manufactured by many manufacturers. However, the Raychem Corporation of California has developed a very high quality MOV that extends its usefulness for LEC applications. The powder contains smaller particles of the additive metal oxides evenly distributed throughout the larger particles of the primary metal oxide. The use of very fine powder base for the MOV essures a more consistant protection voltage, particularly when sliced to various voltages. Tolerances are held to ±0.2%. The following patents assigned to Raychem are representative of the art.

European Patent No. 0,229,464 to Koch et al. (Pub. Jul. 22, 1987) shows a frangible housing for an electrical component reinforced against explosive shattering by wrapping curable sheet material therearound at spaced apart regions. The wrapped material is cured with ultraviolet radiation. This material holds any pieces shattered by over-voltages together.

European Patent No. 0,230,103 to Koch et al. (Pub. Jul. 29, 1987) discloses a surge arrester where circular varistor blocks are stacked for greater voltage applications.

U.S. Pat. No. 5,039,452 to Thompson et al. (August 1991) discloses a process for making ZnO Metal Oxide Varistors (MOV) precursor powder.

PCT Pat. No. WO 91/14304 (GB 91/00405) to Mikli et al. (Pub. Sep. 19, 1991) discloses a surge arrester that has eight varistor blocks stacked together with a fiber-optic cable running through the stack to detect component failure.

PCT Pat. No. WO 93/26017 (U.S. Pat. No. 93/05679) to Wiseman et al. (Pub. Dec. 23, 1993) discloses a method of manufacturing a voltage arrester wherein MOV valve elements are stacked along a longitudinal axis, where the MOV valve elements are compressed between conductive end terminals.

Another solution for low voltage applications of MOV surge arresters is the Wagon Wheel™ technology as implemented by LEA Dynatech of Tampa, Fla., and used in the Lightning Eliminators and Consultants, Inc. (LEC) TVSS products. This technology is based on U.S. Pat. No. 4,875,137 to Rozanski et al. (Oct. 1, 1989). The LEC TVSS products utilize low or medium sized, individually fused Metal Oxide Varesistors ("MOV") in parallel.

U.S. Pat. No. 5,519,564 (1996) to Carpenter, Jr. discloses a sandwich block package for mounting a plurality of MOV's in a parallel, spaced apart fashion. A surge is thereby shared by the group of MOVs. Each MOV in the sandwich must be matched to the set for clamping voltage in order to prevent any single MOV from taking the whole surge because it clamped too early.

Ohio Brass Company of Mansfield, Ohio, manufactures a heavy-duty distribution class surge arrester trademarked the Dynavar® PDV-100. Normal operating voltages are in excess of 2400 volts with clamping voltages around 3000 volts. A single MOV is available packaged in a ribbed EPM rubber housing and epoxy fiberglass wrap cylindrical container. There is no suggestion in the power transmission field to sandwich a single MOV in a sandwich block configuration.

One relevant prior art reference is U.S. Pat. No. 5,088,001 (1992) to Yaworski et al. This device as shown in his FIG. 2 is used for high voltage power distribution and surge protection. An exterior rubber body has a conductive outer layer to transmit surface transients to ground for personnel protection. A pair of thin metal end plates are used to make contact with one or more high voltage MOV's stacked in series, each of which are one inch thick and one and three-quarter inches in diameter. A conductive glue is used to cure surface defects. This glue will decompose at about the same peak current rating of the MOV which is for a 40 mm MOV 30,000 amps (model number V131CA40, CA Series). The structural rigidity is provided by a non-conductive internal epoxy and the exterior rubber shell. The use for the MOV's and the housing is to self destruct without creating a personnel hazard upon a catastrophic surge such as a lightning strike. The application for the device is limited to high voltage or 2,000, up to 33,000 volt primary power distribution systems.

The present invention is new, useful and non-obvious in view of Yaworski and all known prior art because the low voltage (up to 660 volt) secondary power applications create totally different problems. The present invention is designed to handle over 800,000 amperes (rather than 30,000 amperes) and to extend the life of the MOV. The present invention is designed to prevent self destruction and extend its reliability. The present invention is structurally held together with nuts and bolts and optionally has an outer hard plastic box enclosure. The present invention uses novel thin low voltage, high surge current, deposition coated MOV's of large diameters, made especially for up to a 660 volt system for secondary commercial voltages. The present invention maximizes the heat transfer, and low path impedance, to survive a lightning caused current surge, and not self destruct. Yaworski stacks MOV's to handle high voltage requirements because no single MOV as yet handles primary high voltages to 33,000 volts.

Yaworski's high voltage small diameter disks have low impedance due to small diameters. Yaworski's conductive epoxy breaks down at 30,000 amps, but the present invention handles up to 800,000 amps using wide diameter MOV's and deposition coatings in conjunction with "soft"

metal disks to make contact between the conductive plates and the MOV. The present invention protects and extends the life of both the circuit and the MOV assembly.

There are several problems with MOV based surge arresters. One problem as illustrated in several of the above patents is that MOVs will often explode when handling excessive transient energy. Compounding this problem is the problem that when MOVs are in parallel, such as with the Carpenter, Jr. '564 patent and Wagon Wheel™ technology above, it is possible that the MOVs have different clamping voltages. Thus, a larger than expected proportion of the surge current may flow through a single MOV. This destroys that part of the parallel circuit. The destruction of the single MOV may cause a chain reaction of similar individual MOV overloads, ultimately destroying the entire parallel circuit. In the case of MOVs stacked in series, such failure will cause the entire surge arrester to fail, instead of just degrade.

Prior technologies use wire based connections to, and between the MOVs to increase the energy handling capability of a single assembly. These wires introduce inductance that slows the reaction time and can add some variation in response time. In addition, these wires make a single point contact with the MOV face, thus concentrating the surge energy in a very localized area at the wire connection. This limits the transfer of surge energy between that wire and the MOV; again leading to the major failure mode, burn through at that point, and uneven distribution of the surge energy to the MOV surface. The present invention will eliminate all of the foregoing problems. A single, custom made, relatively large MOV is sandwiched between two contact plates for application in low voltage (up to 660 volt) circuits, using a soft metal disk to reduce contact resistence.

A new casing holds either a single MOV sandwich for single phase applications or a triple (3 phase) MOV sandwich. The casings are pre-mounted on mounting brackets to facilitate installation by the end user on a buss bar or within a dedicated enclosure. The exterior plastic of the casings prevents arcing, short circuits caused by dust and grease build-up across the plates of the MOV sandwich.

SUMMARY OF THE INVENTION

Surge arresters (protectors) are required for the protection of electronic and electrical equipment. The usual objective is to protect against immediate loss resulting from severe over voltage. However, the degradation of long term reliability is virtually ignored. Yet the potential for reduced reliability, Mean Time Before Failure (MTBF), is significantly greater, particularly in areas of high lightning activity or where there is an unreliable power source. Studies have shown that over 50 percent of the voltage anomalies in an urban area can significantly reduce the MTBF of electronics systems. This will result in equipment losses of unexplained origin usually termed "random failures". These type of failures are often a greater cause of loss than those caused by lightning alone.

All prior art has been designed to deal with lightning only. To prevent reliability degradation, the protector performance requirements are significantly more severe. First, the initial protect or clamping voltage must be much lower than for lightning protection alone. Further, the clamping ratio (voltage at peak current vs. initial voltage) must be much lower than for lightning protection alone; and the maximum surge current must be much higher than the norm or standards.

To accomplish the foregoing objectives, the protector must be able to dissipate about 10 times the energy (Joules) and pass 10 times the surge current (amperes)of that required for lightning protection alone.

Conventional MOV-based protectors are designed to handle a limited amount of surge current and surge energy. This is limited by the size and number of MOV wafers used in parallel for each phase. The operating voltage determines the MOV thickness of the wafer, and the diameter determines the maximum surge current. The thickness of the conductive coating limits the reaction time for the conventional or prior art. These limits force the present art to parallel an appropriate number of these wafers, selected to satisfy the foregoing criteria.

The preferred embodiment teaches the use of large diameter disks, with virtually no practical diameter limit. In fact, one very large wafer can function satisfactorily within this sandwich block assembly. This then eliminates the uneven distribution of energy that is common in any parallel wafer concept.

There are two problems with arranging MOVs in parallel, their clamping voltages vary over a range of at least ±five percent resulting in uneven load sharing; and the inductance of the wires used to make the connections. These were discussed within U.S. Pat. No. 5,519,564 to Carpenter wherein it also disclosed a method for paralleling MOV wafers that overcomes the foregoing problems. That method functioned as expected, but proved to be of limited effectiveness at the higher energy levels because of the MOV/plate interfacing concept, the close air gaps and the fusing limitations. The limitations of the prior art have been overcome by the embodiments presented in this patent.

The main aspect of this invention is to provide a MOV-based surge arrester package with improved cooling, MOV surface contact and reduced risk of component failure and pre-packaged in a plastic case to eliminate the potential for short circuits caused by several factors between the plates including dust and moisture build up.

Another aspect of the present invention is to package a MOV surge arrester to provide uniform current distribution and rapid removal of the heat generated by a surge and pre-packaged to provide ease of installation.

Another aspect of this invention is to provide a MOV based surge arrester package that effectively isolates the individual and permits the packaging of multiple MOVs in a single package for single and three phase applications that assures no premature clamping due to external contamination of any form.

Another aspect of this invention is to provide a single disk MOV surge arrester that can handle over 1,000,000 amperes of surge current yet react in less than 50 nanoseconds to the maximum peak current, pre-packaged in a weather resistant casing. The high peak current capability is required for reliability preservation.

Another aspect of the present invention is to cure surface defects in a MOV by adding a thin deposition coating to the MOV surfaces; and/or use a soft metal "washer" to fit between the sandwich plates and the MOV coating.

Other aspects of this invention will appear from the following description and appended claims, reference being had to the accompanying drawings forming a part of this specification wherein like reference characters designate corresponding parts in the several views.

The instant invention uses ZnO MOVs manufactured from the advanced manufacturing process disclosed in the '452 patent or from conventional processes with reduced effectiveness. The preferred embodiment herein teaches the use of a single thin (0.061 inch–0.500 inch) ZnO MOV having a thin deposition layer and a width of 3.5 inches or more encapsulated between a pair of contact plates. The design increases the lifetime of the surge arrester and the equipment it protects, since the matching of single MOVs is not necessary. The design also provides the energy handling capabilities of a multi-module surge arrester with fewer parts. The primary application is in secondary voltage home and commercial use, up to at least 4160 V RMS.

Alternatively rather then using a deposition coating; the present invention encapsulates the MOVs between two or more soft metal contact plates and the assembly is held together and tensioned with non-conductive nuts and bolts. Using these soft plates, an epoxy, a dielectric rubber coating and a box enclosure results in significant surge arrester performance improvements.

Where the prior art is concerned with lightning only, this invention offers reliability preservation by limiting the let-through voltage, even at peak surge currents to levels well below that which will reduce equipment; Mean Time Before Failure (MTBF). In addition, voltage clamping is initiated at lower than the conventional levels to further influence reliability preservation.

This invention is an extensive improvement over the prior art as covered under U.S. Pat. No. 5,519,564. That prior art presented an improved concept for paralleling MOVs. However, performance was limited by several embodiment factors and did not include the use of a very large diameter MOV wafer. This invention eliminates those limiting factors and provides a unique form of circuit preservation. It provides the capability to use one very large diameter disk, sized to handle all the surge energy possible; and even function under mild overvoltage conditions.

This art also presents an improved method of facilitating a connection between the outer conductive plates and the MOV wafers. It presents a method of eliminating the potential for arcing between the outer plates. It presents a fusing method that will satisfy the requirement to pass the very high surge current, yet open the circuit when required without explosive force, and it presents a method of analyzing the protector requirements to satisfy the reliability protection assembly design. It teaches maintaining a near-perfect contact across the full face of the MOV wafer and simultaneously maintaining the same contact pressure level across the MOV face.

The above noted MOV sandwiches may be further prepackaged in an outer plastic casing (box) having a convenient mounting bracket. The MOV sandwich is covered in an epoxy mold under the exterior plastic casing.

Before explaining the disclosed embodiment of the present invention in detail, it is to be understood that the invention is not limited in its application to the details of the particular arrangement show, since the invention is capable of other embodiments. Also, the terminology used herein is for the purpose of description and not of limitation.

DETAILED DESCRIPTION OF THE INVENTION

Figure 1:
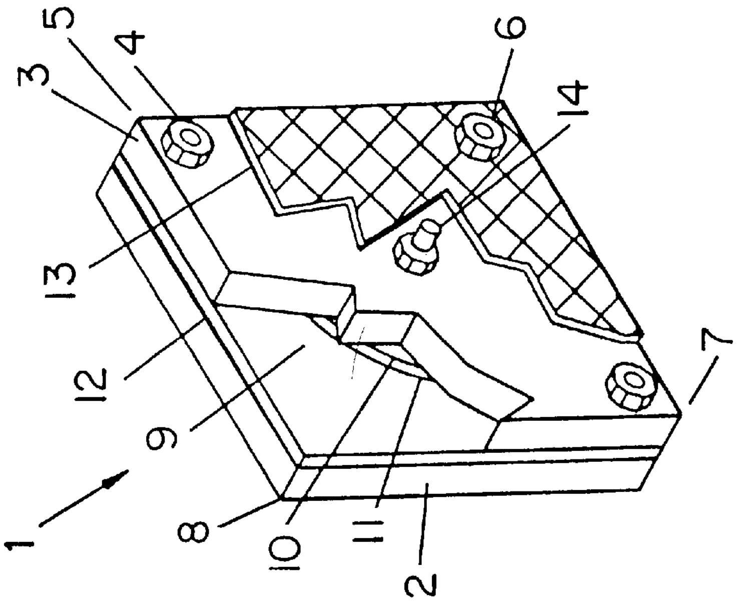
FIG. 1 is a top perspective cutaway view of a single MOV preferred embodiment surge arrester.
Figure 4:
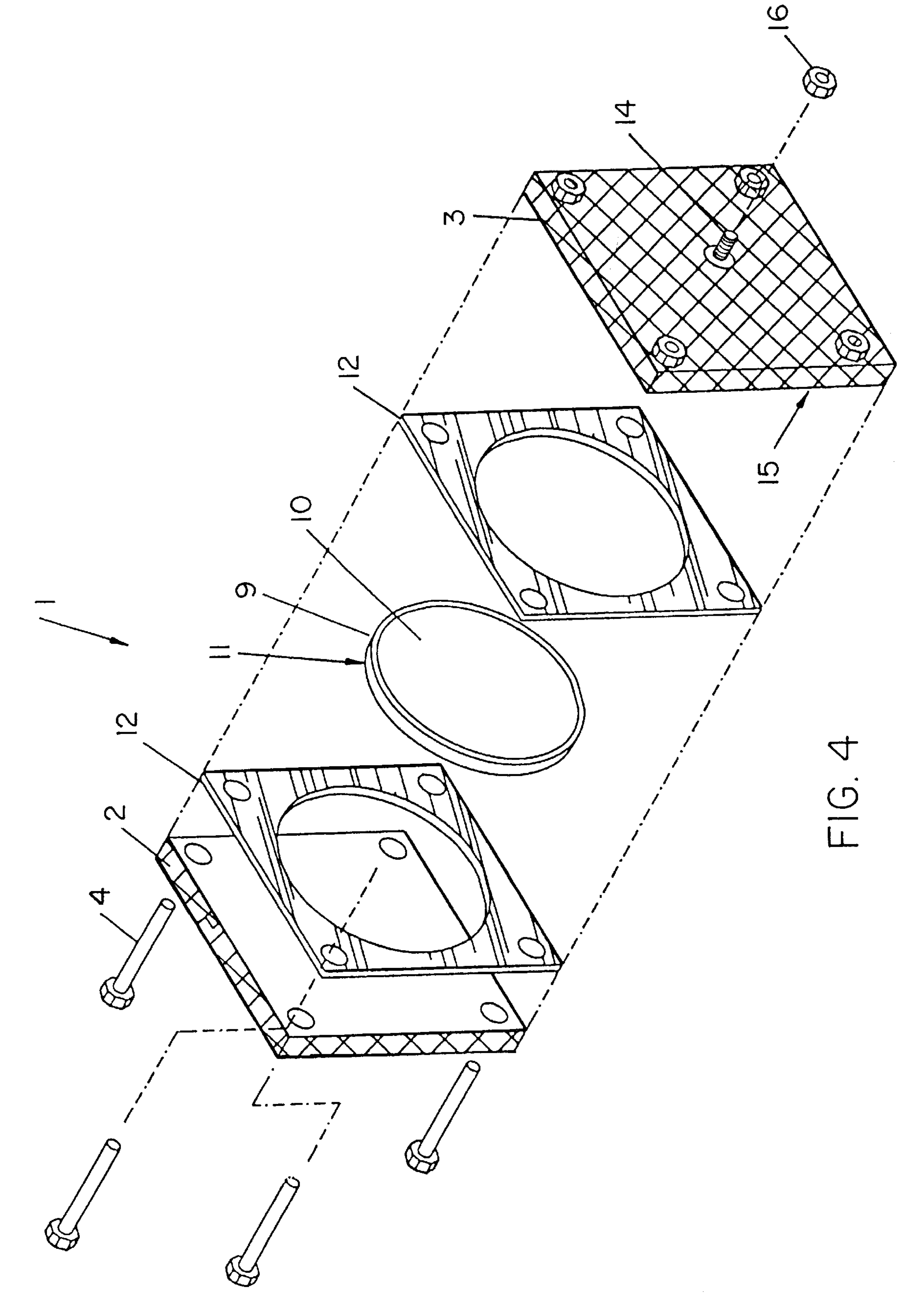
FIG. 4 is an exploded view of the surge arrester shown in FIG. 1.

Referring first to FIGS. 1 and 4 one embodiment of the single MOV surge arrester 1 is shown. Contact plates 2, 3 are preferably made from aluminum. They are held together by nylon nuts and bolts 4 at each corner 5, 6, 7, 8. The MOV 9 has a nominal diameter of 3.12 inches. The MOV 9 is sandwiched by a pair of aluminum disks 10, 11 to cure any surface defects of the MOV. Alternatively, these disks may be made of a dense metallic sponge material.

Figure 16:
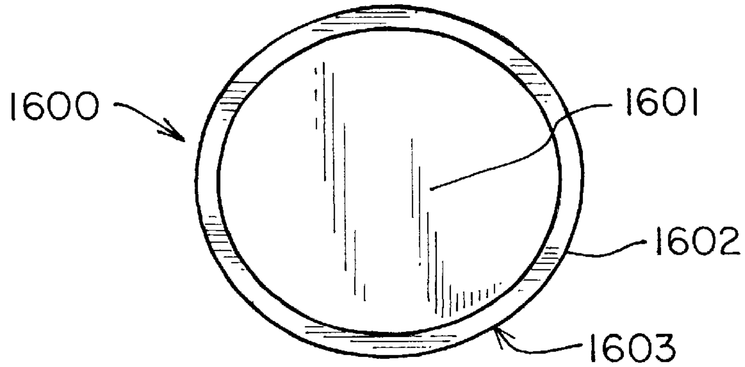
FIG. 16 is a top plan view of a coated MOV

In the preferred embodiment the disks 10, 11 are eliminated. In order to cure surface defects a thin conductive coating is vapor deposited on the surfaces of the MOV as shown in FIG. 16.

Low Temperature Arc Vapor Deposition (LTAVD) was developed in Boulder, Colo. In 1981, Vapor Technologies of Boulder, a division of Masco Corp., developed LTAVD along with other thin film coating techniques. The present company was incorporated in 1988, and the first major commercialization of the processes and equipment started in 1989.

The LTAVD process deposits a variety of functional and decorative metallic coatings on virtually any substrate from metals to plastic. It is used for automotive decorative styling and functional components, medical devices and instruments, EMI/RFI/ESD shielding on plastic electronic housings, functional coatings for aerospace applications and decorative coatings on household hardware, jewelry and plastics. Obviously, the parts can vary widely in shape, size and configuration.

LTAVD is a physical vapor deposition process that employs a high-current, low-voltage electric arc to evaporate essentially any electrically conductive material. The material to be deposited is fashioned as a cylindrical source on which the electric arc is ignited. The deposition process is operated in a highly controlled vacuum to deposit adherent, dense, thin-film coatings.

LTAVD has a number of advantages over other physical vapor deposition techniques, as well as benefits not found in chemical vapor deposition. LTAVD coatings are highly adherent as well as wear and corrosion resistant. Also, LTAVD can coat at room temperature or higher and does not add significant thermal energy (heat) to the substrate. Heat can be detrimental to parts, causing loss of temper, deformation or a change in crystal structure.

The process is highly productive; deposition occurs over a 360 degree field rather than a 180 degree field. Thus, parts being coated are always in coating plasma, a significant advantage for film quality and deposition rate.

Electrodes can be configured in any shape necessary to "fit" the parts being coated. When a planetary fixture is not feasible, the electrode can be configured to coat the substrate without moving the substrate, such as a pipe coated on the inside and outside with a single electrode. However, both the substrate and electrode can be moved if necessary. Electrodes can be made from solid sintered, cold-pressed powder ingot of any metal, alloy or carbon class materials.

Because there is little waste heat and low thermal radiation, the process has the ability to deposit materials with high melting points onto substrates with low melting points. So, high-melting-point metals like tungsten (3410C) can be applied to plastic films without using a heat sink and without damaging the substrate. The energies of the metallic ions ejected from the electrode are high (60 to 100 electron-volts/ion). The ionization percentage is excellent, greater than 90 pct, which allows for good mechanical adhesion even if the substrate temperature is ambient.

When substrates are heated, there is good mechanical adhesion, depending on the substrate. Elevated temperatures do not interfere with the process, so the temperature of the substrate is totally controllable.

Because the arc travels on the electrode surface, its speed is controllable. The area to be coated can be fine tuned from a narrow area to a full 360 degrees of coverage. Coating uniformity is provided by the uniformity of the arc's traverse across the surface of the electrode, with a spent electrode appearing as if it has been uniformly eroded or milled.

Coating rates and uniformity are excellent. Deposition rates are rapid. Film thickness varies from 300 angstroms to a few mils, depending on what is specified.

Deposition rates are inversely proportional to distance. With high melting point, high-density metals and ceramics, deposition rates are lower. The erosion rate for nickel is more than one gram per min per electrode. A typical uniformity specification is plus or minus five pct for thin-film processes. Large areas or volumes can be coated uniformly because of the high rate of deposition, capacity for large target sizes and the large vacuum chamber.

Alloy Coatings Dissimilar materials can be alloyed using LTAVD. Materials not commercially available can be deposited using the process. This requires synthesis of a target, then deposition using LTAVD. This is useful for compounds such as titanium/aluminum and others that have different melting and evaporation points.

The purity of the deposited materials is the same as the starting materials. Alloys preserve their composition through the coating process. Ceramic materials can be synthesized by evaporating a metal or alloy in the presence of a low-pressure reactive gas, resulting in materials such as titanium carbonitride (TICN) and titanium oxide. Pure carbon can also be evaporated.

LTAVD has also been used to coat substrates that cannot be heated more than a few hundred degrees, such as epoxy metal composites, and substrates with complex surface geometries. The coatings include a variety of metals and reacted metal nitrides, carbides and oxides. These coatings solve problems caused by corrosive and oxidative hot gases, acids, caustics, organics and molten materials.

The preferred embodiment of the MOV is shown in FIG. 16 denoted 1600. The top (and identical bottom) surfaces 1601 are coated up to an outer periphery 1602 of 1/16 inch. The outside edge 1603 is uncoated. The coating is preferably a LTAVD copper 10 micron or thicker coating. A non-conductive epoxy 12 fills all space between the contact plates 2, 3. The epoxy preferably is a number 51-40 by E V Roberts, Inc.®, also known as "STYCAST"™ 2651-40 Epoxy Encapsulate by W. R. Grace & Co., Conn. The epoxy 12 prevents moisture from reaching the MOV 9, dissipates heat faster than air, increases the breakdown voltage between the contact plates 2, 3, and enhances the mechanical strength of the surge arrester 1 to resist vibration deterioration. Air has a breakdown voltage of 3KV/mm as compared to 20 KV/mm for the epoxy 12.

A dielectric sealant 13 covers the entire outside of the surge arrester 1. The dielectric sealant 13 preferably is rubber having a strength of 2600 volts per millimeter. The best mode uses seven sprayed coats of Loctite® to achieve about a 5 millimeter coating. The dielectric sealant 13 prevents moisture from seeping into the MOV 9, helps keep the surge arrester 1 clean, and prevents arcing at the corners 5, 6, 7, 8 where dirt tends to accumulate.

A conductive bolt 14 is countersunk into the inside surface 15 of contact plate 3 to provide a connection to a conductor with a nut 16.

Figure 2:
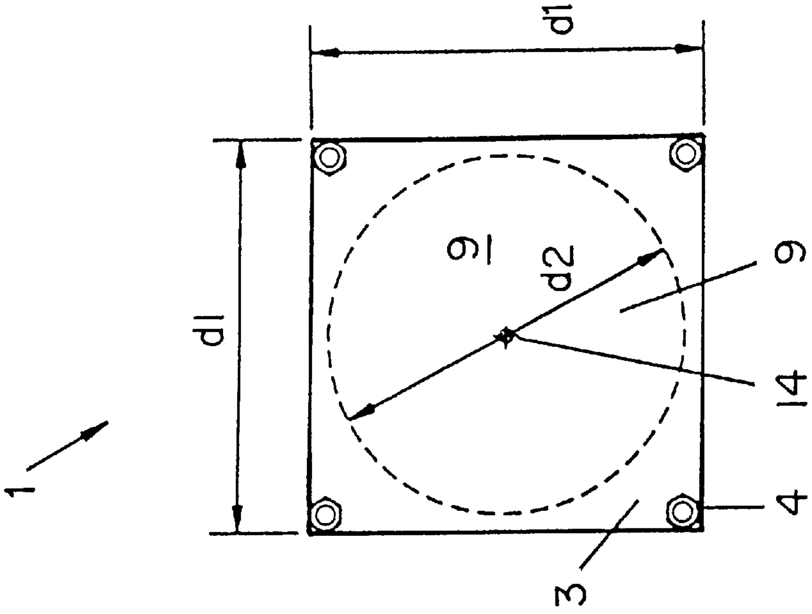
FIG. 2 is a front plan view of the surge arrester of FIG. 1.
Figure 3:
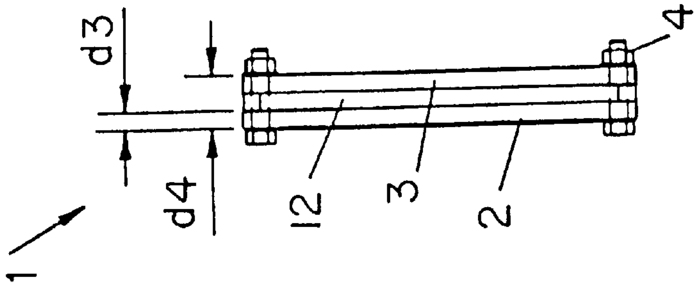
FIG. 3 is a side plan view of the surge arrester shown in FIG. 1.

Referring next to FIGS. 2, 3 nominal dimensions are $d_1$=3.73 inches, $d_2$=3.12 inches, $d_3$=0.25 inches, $d_4$=0.74 inches.

The preferred embodiment of the MOV is shown in FIG. 16 and substituted for the MOV 9 and disks 10, 11 of FIGS. 1, 2, 3. The preferred embodiment assembly using MOV 1600 in the assembly of FIG. 1 is used in commercial power distribution systems up to 660 volts, with a single MOV on each 220 volt leg. Raychem® makes the preferred embodiments of the thin MOV's as noted in the chart below. Our low voltage MOV disk slices are set up and standardized on varistor properties using the 2.2 protective level (peak voltage=2.2×application voltage rms):

| PCN | Description | App. V | Switch V | Height |
|---|---|---|---|---|
| 911023-000 | DSK-V264-7-171-42AUU | 120 | 264 | 0.061" |
| 573535-000 | DSK-V487-6-171-42AUU | 220 | 484 | 0.111" |
| 173809-000 | DSK-V528-6-171-42AUU | 240 | 528 | 0.118" |
| 880273-000 | DSK-V610-5-171-42AUU | 280 | 616 | 0.143" |
| 179835-000 | DSK-V1056-5-171-42AUU | 480 | 1056 | 0.243" |

Switch voltage means clamping voltage.
The tolerance on the height is +/− 0.05 mm.

The preferred embodiment carries large surge currents (over 100,000 amps) in less than 50 nanoseconds. It provides uniform current distribution over large diameter MOV faces. This provides rapid heat transfer from the MOV, thus extending the life of the MOV.

Figure 6:
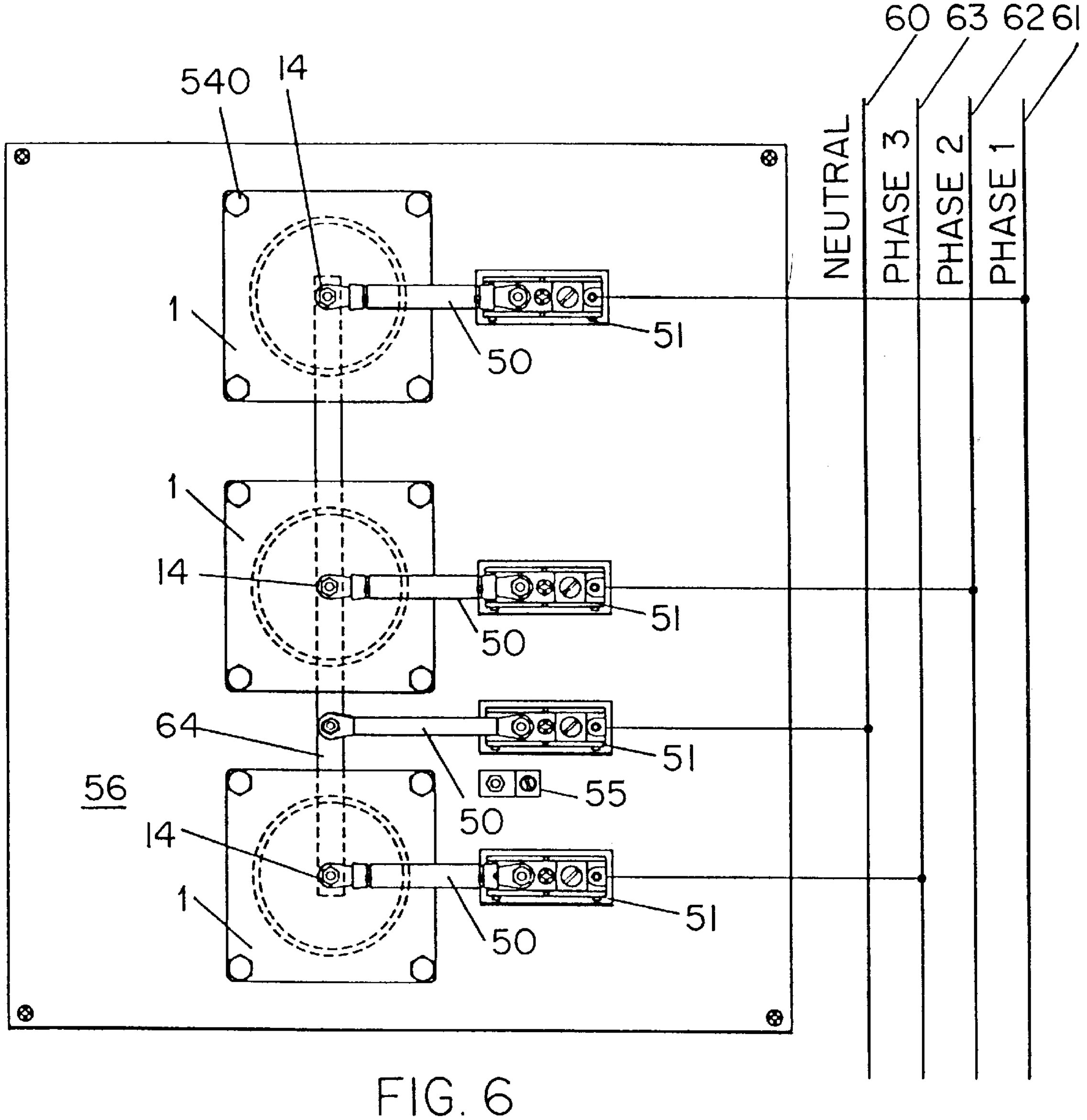
FIG. 6 is a top plan view of a three-phase surge arrester circuit.
Figure 5:
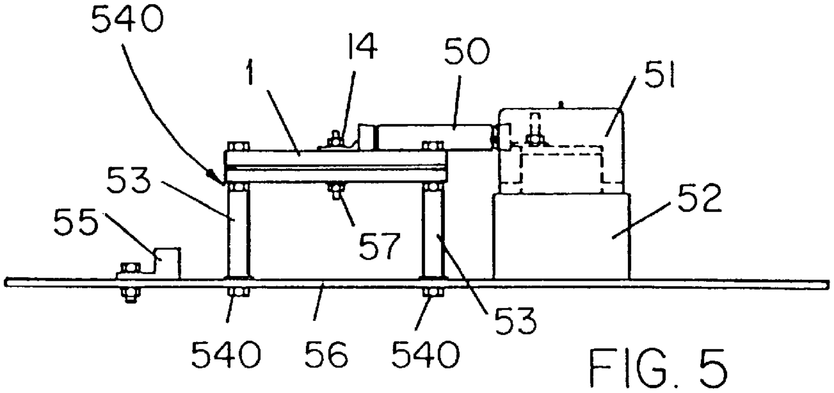
FIG. 5 is a side plan view of a surge arrester wired to a 120/240 volt single phase circuit.

Referring next to FIGS. 5, 6 a preferred mode of installation wiring for the surge arrester 1 is shown. The surge arrester 1 is mounted on an aluminum backpanel 56 having a grounding lug 55 wired to ground (not shown). Four plastic standoffs 53 insulate the surge arrester 1 from the aluminum backpanel 56. Nylon bolts and nuts 540 secure the plastic standoffs 53 to the aluminum backpanel 56.

Electrically connected to the conductive bolt 14 is a fuse 50, nominally 80 amps. The fuse 50 is electrically connected to a stud block 51 and stud block extension 52. The neutral conductor 57 connects to a neutral bus 64 shown in FIG. 6.

FIG. 6 shows a typical wiring layout for a three-phase power system having a neutral line 60. Phase 1 is numbered 61, phase 2 is numbered 62, and phase 3 is numbered 63.

Figure 7:
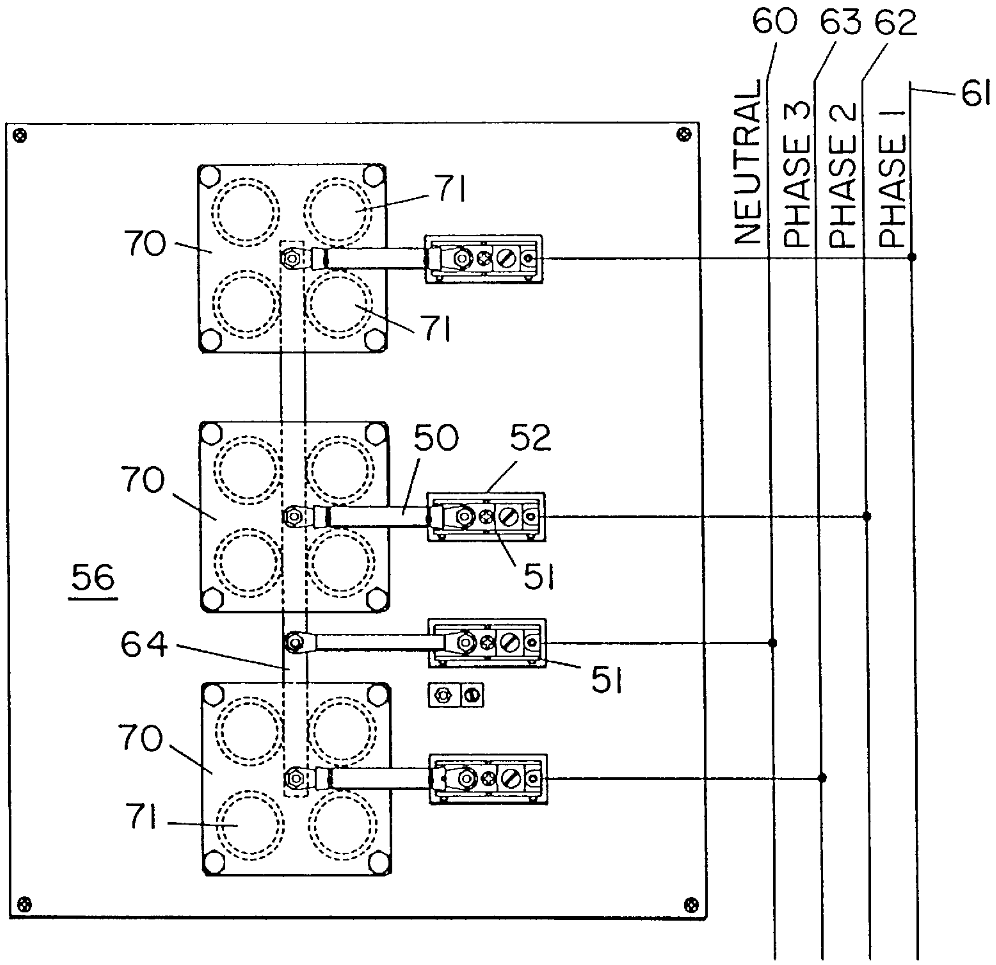
FIG. 7 is a top plan view of an alternate embodiment of a three-phase surge arrester using four MOV surge arrester modules.

Referring next to FIG. 7 the same three-phase power system is shown protected by the same surge arrester circuit shown in FIG. 6. An alternate embodiment four MOV surge arrester 70 is used. Surge arrester 70 has the same epoxy and rubber coating construction shown in FIG. 1.

Figure 8:
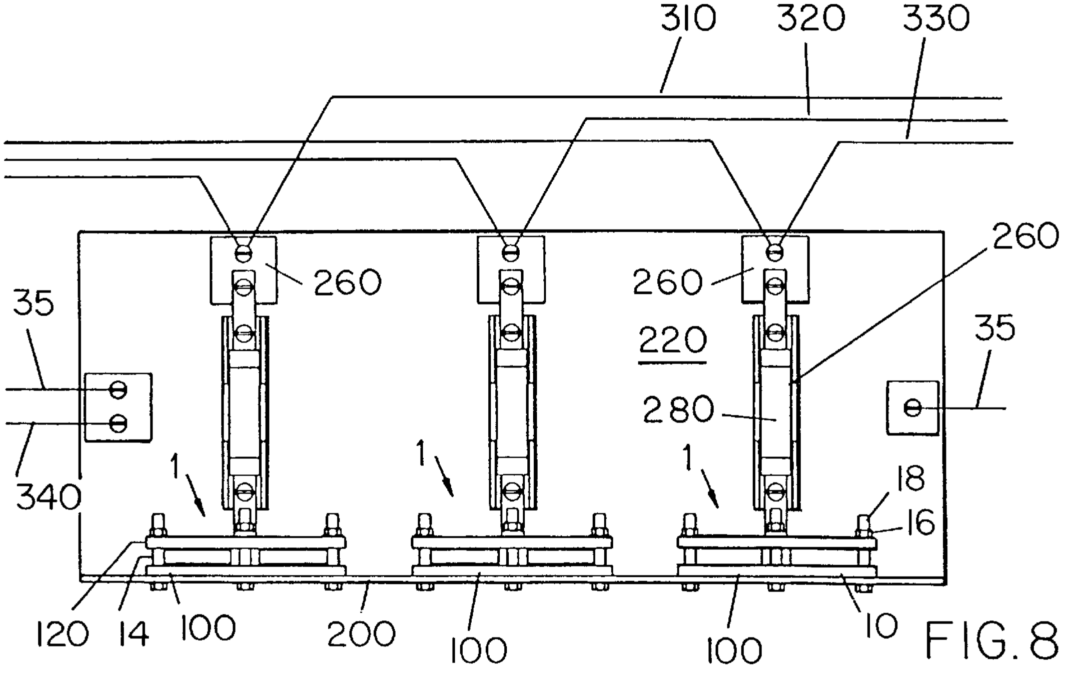
FIG. 8 is a top plan view of an alternate embodiment of the three-phase surge arrester shown in FIG. 6.

Continuing with the discussion of FIGS. 8, another standard protection circuit is shown using the preferred embodiment of the surge arrester 1. The first aluminum contact plate 100 is attached to an aluminum mounting plate 200. Again, the aluminum helps dissipate heat. Attached in series with each pair of contact plates 100, 120, is a fuse 280 in a fuse block 260. The fuse 280 is a slow blow fuse. The three phase current 310, 320, 330 is connected to the fuse block 260. Attached to each fuse block 260 is a lead to a signaling device. This signaling device may be a light bulb or a LED (not shown). It is used to tell if a specific surge eliminator is healthy. Finally, each fuse block 260 is attached to but electrically isolated from a grounding plate 220, which is connected to the mounting plate 220 and uses a grounding connection to ground 340. Also present is a neutral connection 350.

Below follows a detailed description and bill of materials needed to manufacture the preferred embodiment of the surge arrester 1:

| PARTS: | QTY.: |
|---|---|
| Plate, Aluminum, 3.63 × 3.63 × 1/4 | 2 |
| Bolt, 1/4 - 20 × 1 3/4, Nylon | 4 |
| Nut, 1/4 - 20, Nylon | 4 |
| MOV, Coated | 1 |
| Screw, #10 × 32 × 5/8, FHSL, Bronze | 2 |
| Washer, #10, SPLK, Bronze | 2 |
| Nut, #10 - 32, Bronze | 2 |
| Disk, aluminum foil (cure single or 4 disk imperfect surfaces) | 2 |
| Epoxy - EV Roberts, Inc. ®, No. 51 - 40 unpigmated | 1 |

General Notes:

Protective gloves must be worn while handling MOV disks.

Torque bronze bolts to 35 in-lb.

Torque nylon bolts to 7 in-lb.

MANUFACTURING:

1. a) Insert the # 10 screw through the center hole of the 3.63x3.63 plate. Secure the #10 washer and nut.

b) Insert the one nylon bolt through the 0.266 dia hole at each corner of the 3.63x3.63 plate.

2. Place one (1) aluminum foil disk centered on 3.63x3.63 plate.

* Quality check: Use cross pattern to ensure equal distribution of pressure during the next step.

b) Place 1 MOV centered over the aluminum disk.

c) Place 1 aluminum foil disk centered over the MOV.

3. a) Being careful not to disturb the alignment of MOVs or aluminum disks, carefully install 3.63x3.63 plate over the MOV with nylon bolts through matching holes on 3.63x3.63 plate.

* Quality check: Use cross pattern to ensure equal distribution of pressure during the next step.

b) Secure module plates with nylon nuts and tighten to the torque value specified in the general notes. This final torque value shall be achieved in 2 stages of tightening.

* Quality check: Conduct a visual inspection of the module assembly to insure all disks are properly seated during the next step.

4. Holding the module to a light source verify all disks are flush with aluminum plates, and no air gap exist between plate, aluminum foil disk and MOV.

* Quality check: If light can be seen between plate and MOV remove plate(s) and reassemble module as per instructions above. If aluminum foil can be seen on outside edge of MOV remove plate(s) and reassemble module as per instructions above.

5. Seal three sides of module with capton tape and latex sealant. Mix unpigmented epoxy per manufacturers written instructions. Slowly pour epoxy into module until filled.

* Quality check: Due to air bubbles and settling, pouring process must be monitored closely.

6. When settling has ceased (approximately 10–15 minutes) and module is full, remove excess epoxy until flush with plate edge.

7. When epoxy has cured, remove capton tape and clean all excess epoxy and other material from exterior of modules excluding epoxy fill side.

Below follows the typical operating characteristics of the surge arrester 1 and/or the four MOV embodiment 70:

TYPICAL VALUES

| Disk Height mm | Max. operating Voltage MCOV (25° C.) Vrms | Clamping Voltage V at 5mA ac (25° C.) Vp | Clamping Vc at 10kA (25° C.) Vrms |
|---|---|---|---|
| 1.54 | 120 | 264 | 500 |
| 2.85 | 220 | 487 | 900 |
| 3.09 | 240 | 528 | 1000 |
| 3.57 | 280 | 610 | 1200 |
| 4.58 | 360 | 738 | 1500 |
| 6.18 | 480 | 1056 | 2000 |

You can assume MCOV at 85° C. is equal to MCOV at ambient conditions. MOV voltage at 1 mA dc is typically about 5% less than values reported for voltage at 5 mA ac.

Figure 9:
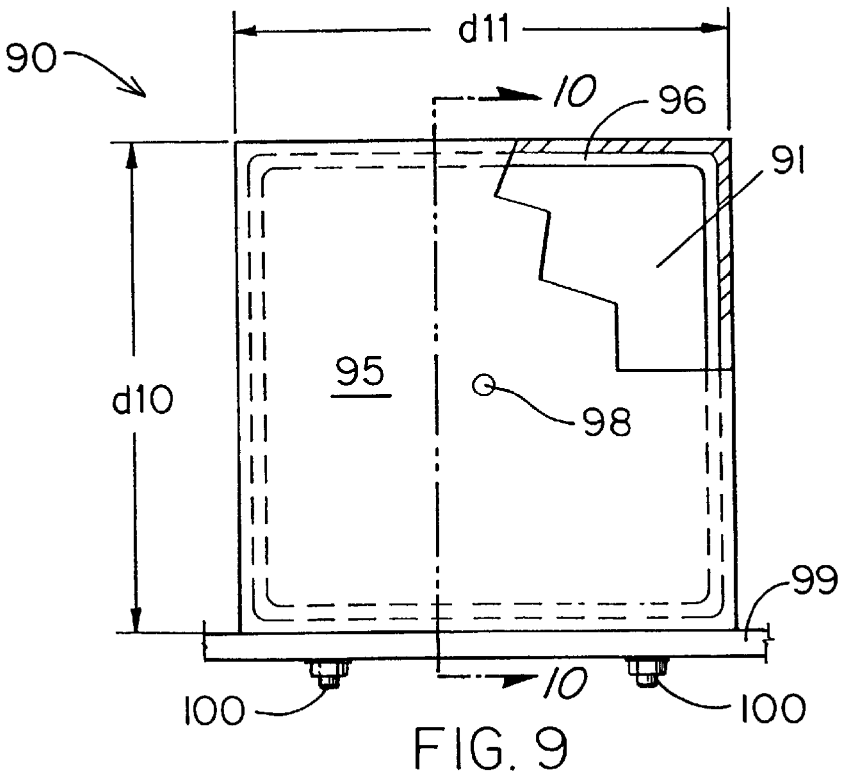
FIG. 9 is a side plan view of a single MOV case preferred embodiment with a cutaway.
Figure 10:
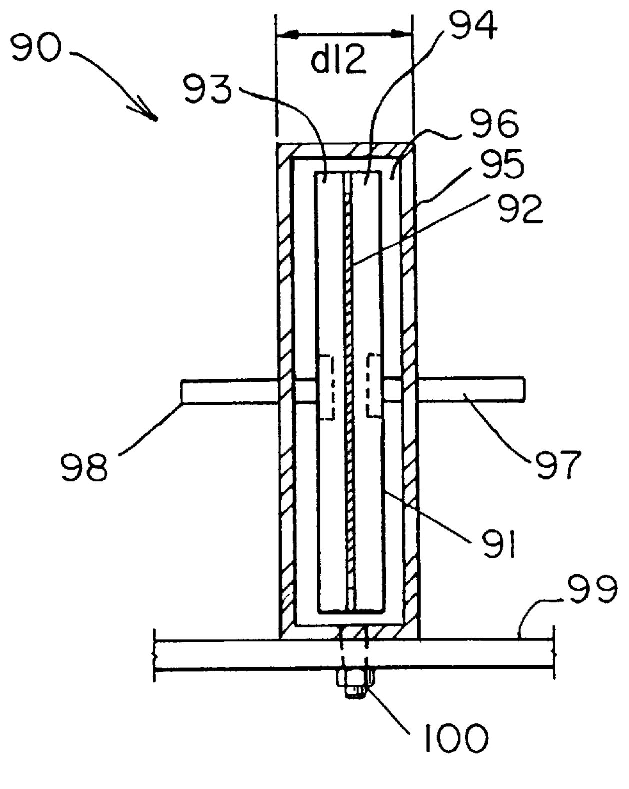
FIG. 10 is a cross sectional view taken along line 10—10 of FIG. 9.
Figure 11:
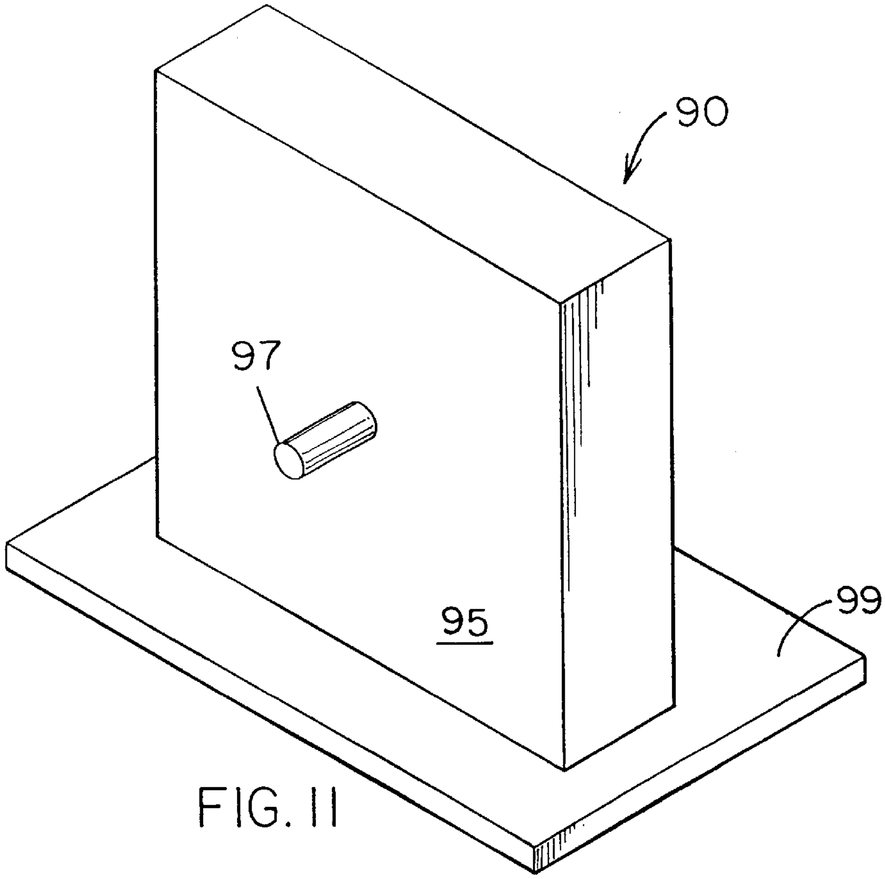
FIG. 11 is a top perspective view of the embodiment shown in FIG. 9.

Referring next to FIGS. 9, 10, 11 a MOV case 90 houses a single MOV assembly 91. The single MOV assembly 91 consists of plates 93,94 which sandwich the MOV 92 in the same manner as shown in FIG. 4. The epoxy 12 shown in FIG. 4 is also used as filler 96 in FIG. 10. The phase conductor 97 is preferably a bolt extending from plate 94 through the exterior case 95 as best seen in FIG. 11. The ground conductor 98 is preferably a bolt extending from plate 93 through the exterior case 95. Exterior case 95 is preferably made of plastic. Nominal dimensions $d_{10}=d_{11}=$ 4.50 inches, and $d_{12}=1.25$ inches. Mounting plate 99 is fastened to the exterior case 95 by nut and bolt assemblies 100. Nut and bolt assemblies 100 can be used to fasten the MOV case 90 to a substrate (not shown). It can be seen that dirt, grease or water build-up on the exterior case 95 will not effect the electrical characteristics of the MOV assembly 91. Whereas in the embodiment shown in FIG. 1 a similar build-up could detract from the electrical characteristics of the MOV surge arrester 1.

Figure 12:
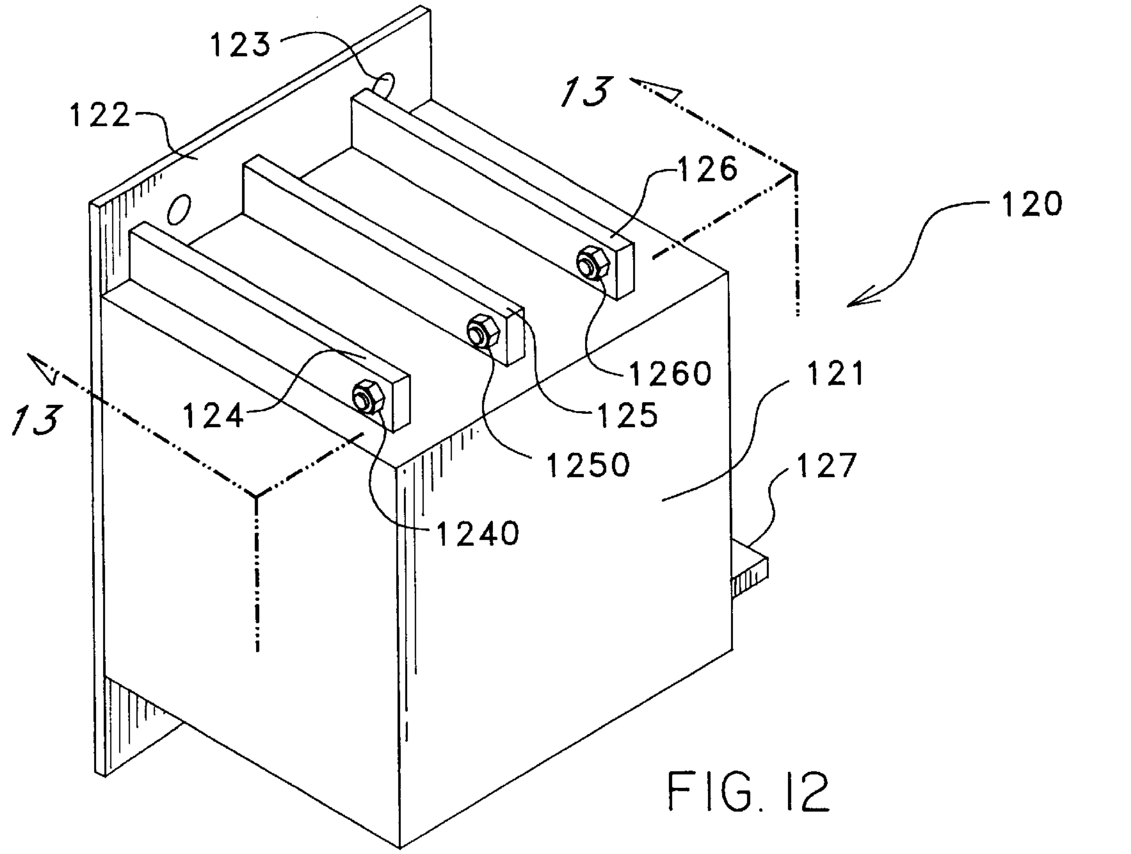
FIG. 12 is a top perspective view of a three phase preferred embodiment of the MOV case.
Figure 13:
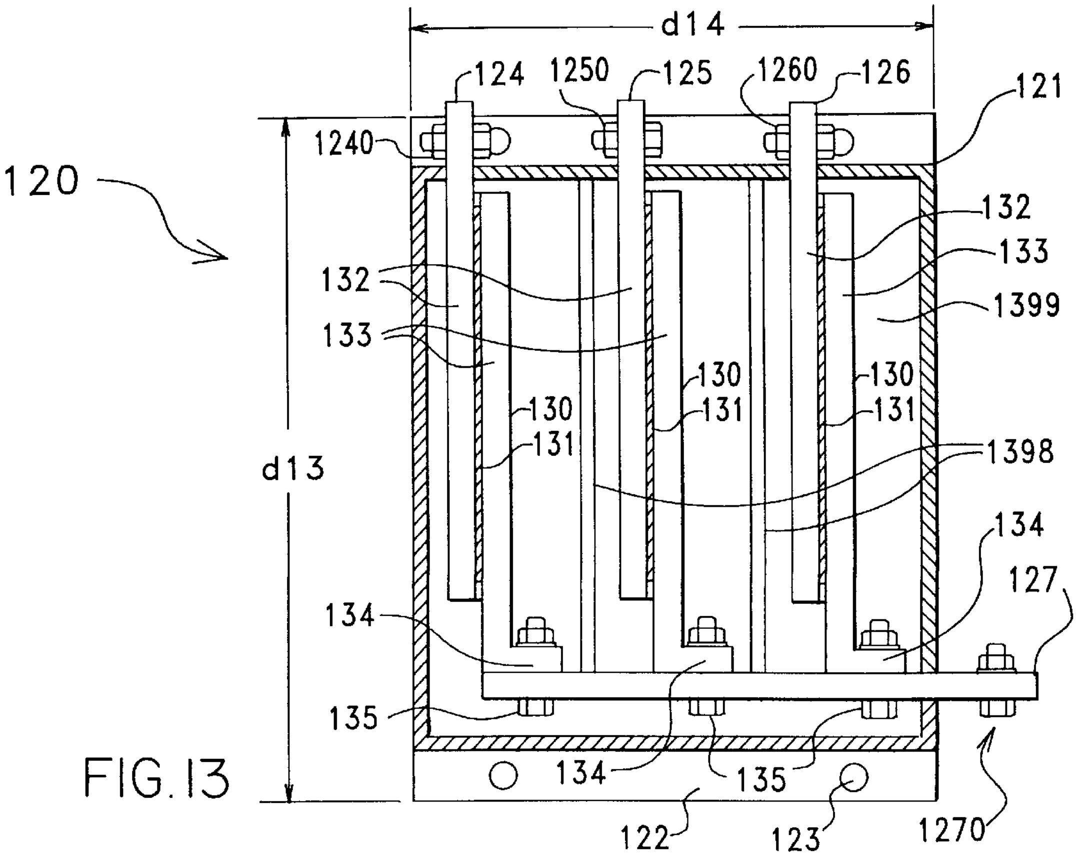
FIG. 13 is a cross sectional view taken along line 13—13 of FIG. 12.

Referring next to FIGS. 12, 13 a three phase MOV assembly 120 is shown. The exterior case 121 is preferably made of plastic. A mounting bracket 122 has mounting holes 123. Phase 1 connecting plate 124 has a connector 1240. Phase 2 connecting plate 125 has a connector 1250. Phase 3 connecting plate 126 has a connector 1260. Ground conductor 127 is preferably a 0.25 inch thick aluminum plate having a connector 1270.

Each MOV assembly 130 is identical and electrically equivalent to the MOV surge arrester 1 of FIG. 1. The MOV's 131 are sandwiched between plates 132, 133, and the sandwich includes an epoxy 12 which is identical to the filler 1399. The plastic dividers 1398 provide structural rigidity. Plates 132 are flat and extend through the exterior case 121 to form connecting plates 124, 125, 126. Plates 133 bend to form brackets 134 which are nut and bolt assemblies 135 for attaching to the ground connector 127. Nominal dimensions are $d_{13}$=6.75 inches, $d_{14}$=5.17 inches. Once again dirt, grease or water build-up on exterior case 121 will not effect the electrical characteristics of the MOV assemblies.

Figure 14:
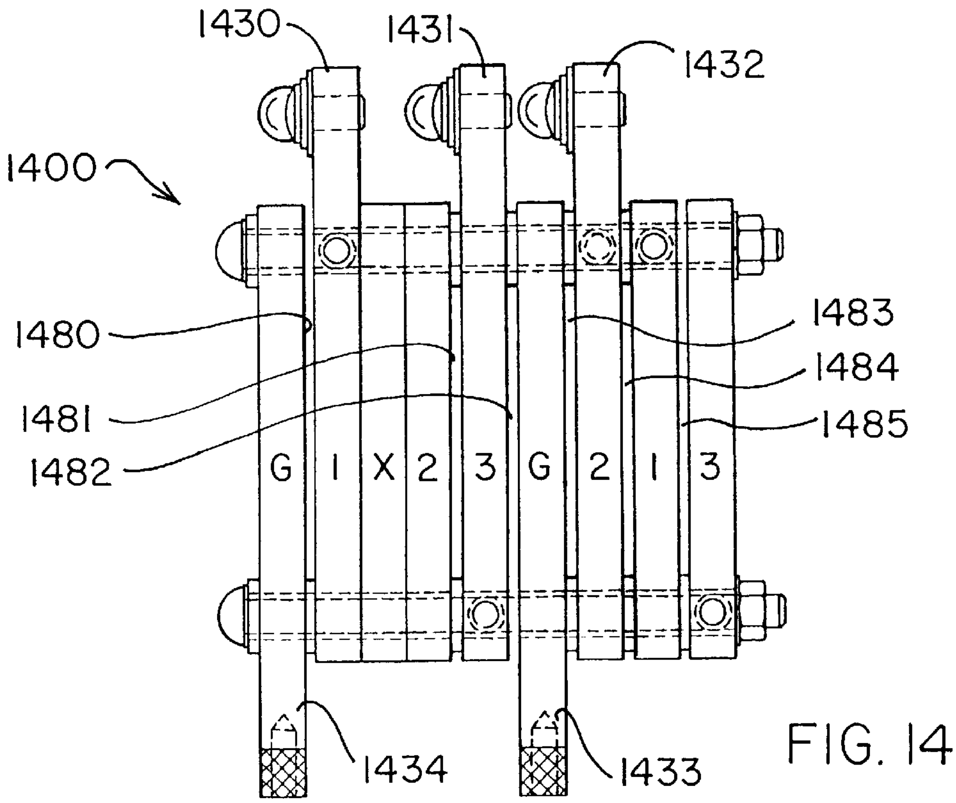
FIG. 14 is a side plan view of a 3 phase module, an alternate embodiment.
Figure 15:
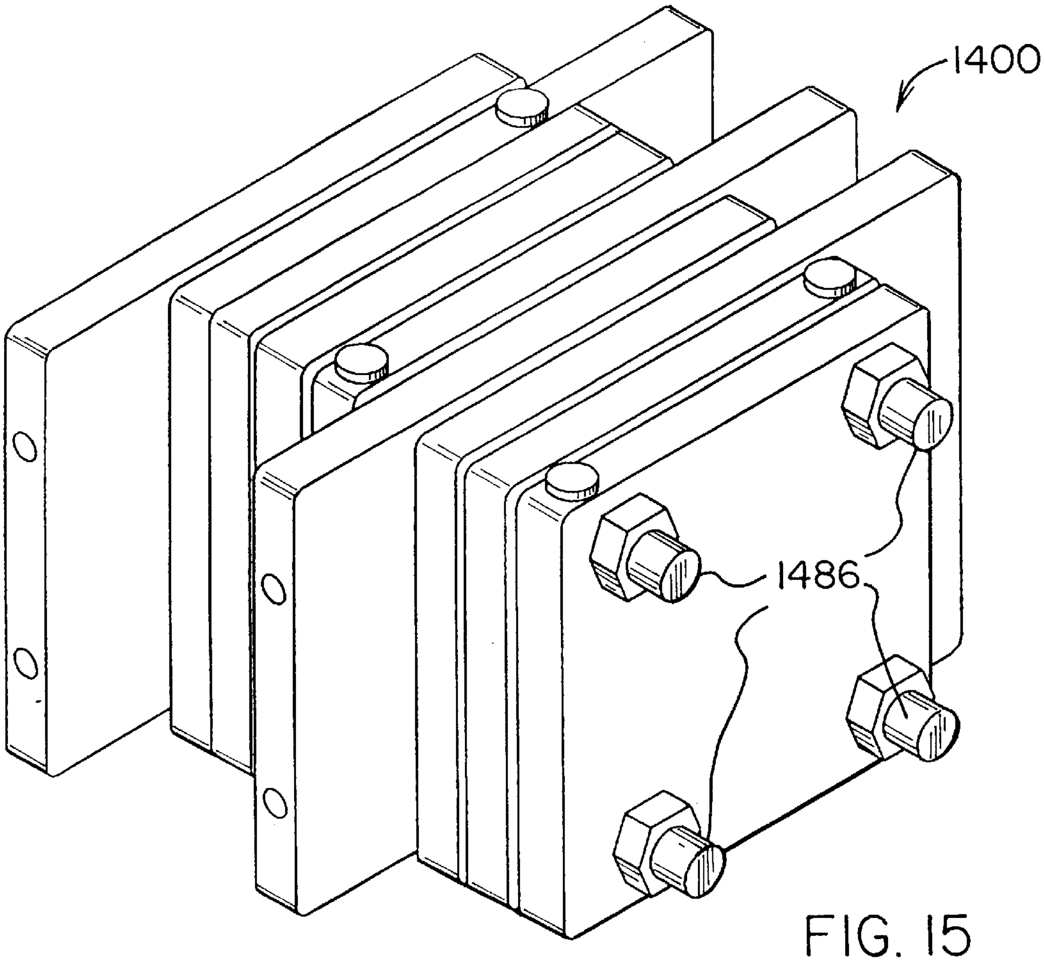
FIG. 15 is a bottom perspective view of the embodiment shown in FIG. 14.

Referring next to FIGS. 14, 15 an alternate embodiment, 3 phase block 1400 is shown. G=ground, 1=phase 1 power, 2=phase 2 power, 3=phase 3 power, and x=a spacer. MOV 1480 protects phase 1 to ground. MOV 1481 protects phase 2 to phase 3. MOV 1482 protects phase 3 to ground. MOV 1483 protects phase 2 to ground. MOV 1484 protects phase 1 to phase 2. MOV 1485 protects phase 1 to phase 3. Nut and bolt assemblies 1486 maintain the structural rigidity of the 3 phase block 1400. All the sealing layers between MOV's and plates are identical to the construction shown in FIG. 1, but preferably using the deposition type MOV's shown in FIG. 16. Staggered easy to mount connection ends 1430–1434 provide a compact, low voltage (up to 660 V) surge protection module.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A surge arrester for low voltage up to 220 volt per phase use comprising:

a pair of conductive plates having a parallel spatial relationship with a space therebetween;

a single, wide diameter, thin thickness MOV supported between said conductive plates in said space, and having a conductive contact with each of said plates;

a non-conductive epoxy filling said space;

a dielectric coating encapsulating said plates and said epoxy;

whereby a power connection to said pair of conductive plates provides a surge protection for an electric current without self destructing with a 100,000 amp surge across the MOV; and a soft conductive disk on each side of the MOV to cure surface defects; and a non-conductive nut and bolt at each corner of the conductive plates to hold together and tension said plates.

2. The surge arrester of claim 1, wherein said soft conductive disk further comprises aluminum.

3. The surge arrester of claim 1 further comprising an outer hard plastic shell.

4. The surge arrester of claim 1, wherein the thickness of the MOV ranges from 0.060 inch to 0.250 inch.

5. The surge arrester of claim 1, wherein the wide diameter of the MOV ranges from 42 to 80 millimeters.

6. A surge arrester for low voltage up to 220 volt per phase use comprising:

a pair of conductive plates having a parallel spatial relationship with a space therebetween;

a single wide diameter thin thickness MOV supported between said conductive plates in said space, and having a conductive contact with each of said plates;

a non-conductive epoxy filling said space;

a dielectric coating encapsulating said plates and said epoxy;

whereby a power connection to said pair of conductive plates provides a surge protection for an electric current without self destructing with a 100,000 amp surge across the MOV;

a thin conductive deposition coating on each side of the MOV to cure surface defects; and a non-conductive nut and bolt at each corner of the conductive plates to hold together and tension said plates.

7. The surge protector of claim 6, wherein the thin conductive deposition coating comprises a 10 micron low temperature copper coating deposition.

8. The surge protector of claim 7 further comprising an outer hard plastic shell.

9. A three phase surge arrester block for up to a 660 volt system, said surge arrester block comprising:

a plurality of at least eight parallel spaced apart conductive plates having at least two ground plates and a pair of plates for each phase;

said plates comprising at least one staggered plate for connecting a first, a second, a third phase and a ground thereto;

a MOV sandwiched between successive plates to provide phase to phase and phase to ground surge protection;

said MOV's having a thin thickness and a wide diameter to sustain a 100,000 amp surge;

a non-conductive epoxy filling all interstices between said plates;

a dielectric coating encapsulating said plates; and a non-conductive nut and bolt at each corner of the conductive plates to hold together and tension said plates.

10. The surge arrester block of claim 9 further comprising at least one spacer plate.

11. The surge arrester block of claim 9, wherein each MOV further comprises a thin conductive deposition coating on its operating surfaces to cure surface defects.

12. The surge arrester of claim 9, wherein each MOV has a diameter of about 80 millimeters.

* * * * *